United States Patent

[11] 3,591,020

| [72] | Inventors | Robert L. Beninger<br>Sheboygan;<br>Grant Hill, Jr., Elkhart Lake; Lawrence<br>Oertle, Jr., Random Lake, all of, Wis. |
|---|---|---|
| [21] | Appl. No. | 836,870 |
| [22] | Filed | June 26, 1969 |
| [45] | Patented | July 6, 1971 |
| [73] | Assignee | H. G. Weber and Company, Inc.<br>Kiel, Wis. |

[54] STACKER FOR CASES AND THE LIKE
5 Claims, 4 Drawing Figs.

[52] U.S. Cl. .................................... 214/6 DK, 214/6 H
[51] Int. Cl. .................................... B65g 57/06
[50] Field of Search .......................... 214/6 H, 6 DK, 6.1, 6 P; 271/68

[56] References Cited
UNITED STATES PATENTS

| 2,637,450 | 5/1953 | Echelman | 214/6 (K) |
| 2,984,838 | 5/1961 | Parker | 214/6 (H) |
| 3,056,513 | 10/1962 | Von Gal, Jr. | 214/6 (H) |
| 3,101,851 | 8/1963 | Heide et al. | 214/6 (H) |
| 3,225,942 | 12/1965 | Fossenier | 214/6 (K) |
| 3,255,895 | 6/1966 | Klingler | 214/6 (H) |
| 3,366,253 | 1/1968 | Walchhuter | 214/6 (K) |
| 3,374,902 | 3/1968 | Mills | 214/6 (H) |
| 3,456,815 | 7/1969 | Carrels | 214/6 (K) |

*Primary Examiner*—Gerald M. Forlenza
*Assistant Examiner*—Robert J. Spar
*Attorney*—Hill, Sherman, Meroni, Gross & Simpson ABSTRACT: Stacker for boxlike articles, such as shipping cases, operating on the principle of successively depositing a first case onto a platform and stacking the other cases on the first case one on top of the other, as the platform moves downwardly, to provide a vertical column of cases, in which the lowermost case of the column is deposited on a delivery station and the entire column is delivered from the stacker. The platform is guided for vertical movement in a plurality of horizontal planes and is carried by an endless chain, driven by power to move the platform from its loading to delivery stations. The loading station includes slide rails extending along opposite sides of the platform and a fluid pressure-operated motor for moving the slide rails outwardly of the platform to deposit a case on the platform. The delivery station may be a delivery conveyor extending within the platform to accommodate the platform to deliver a stack of cases thereto. An infeed conveyor is provided to deliver cases to the loading station. A stop gate is operable to prevent the delivery of a case to the loading station, while one case is on the loading station.

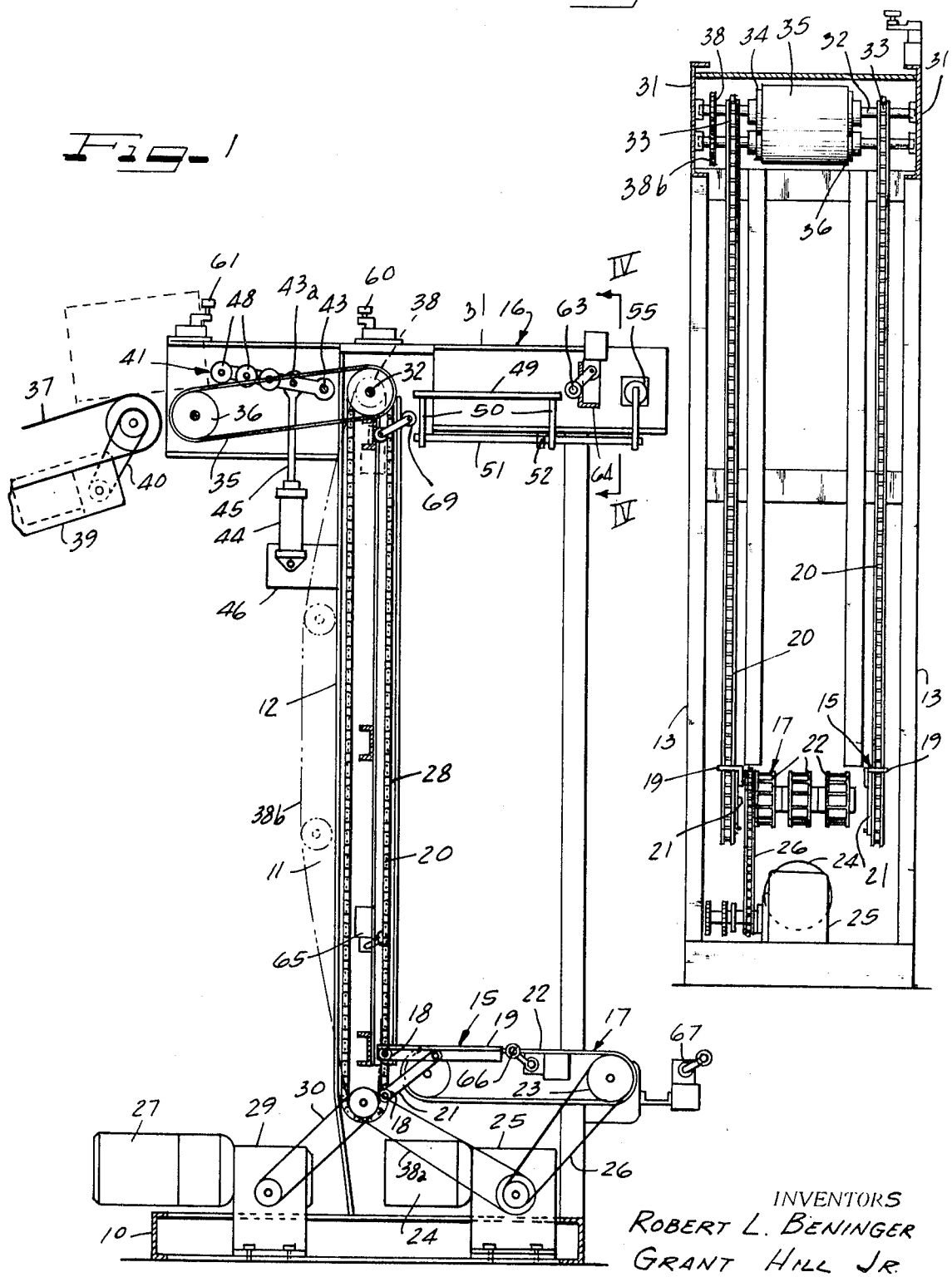

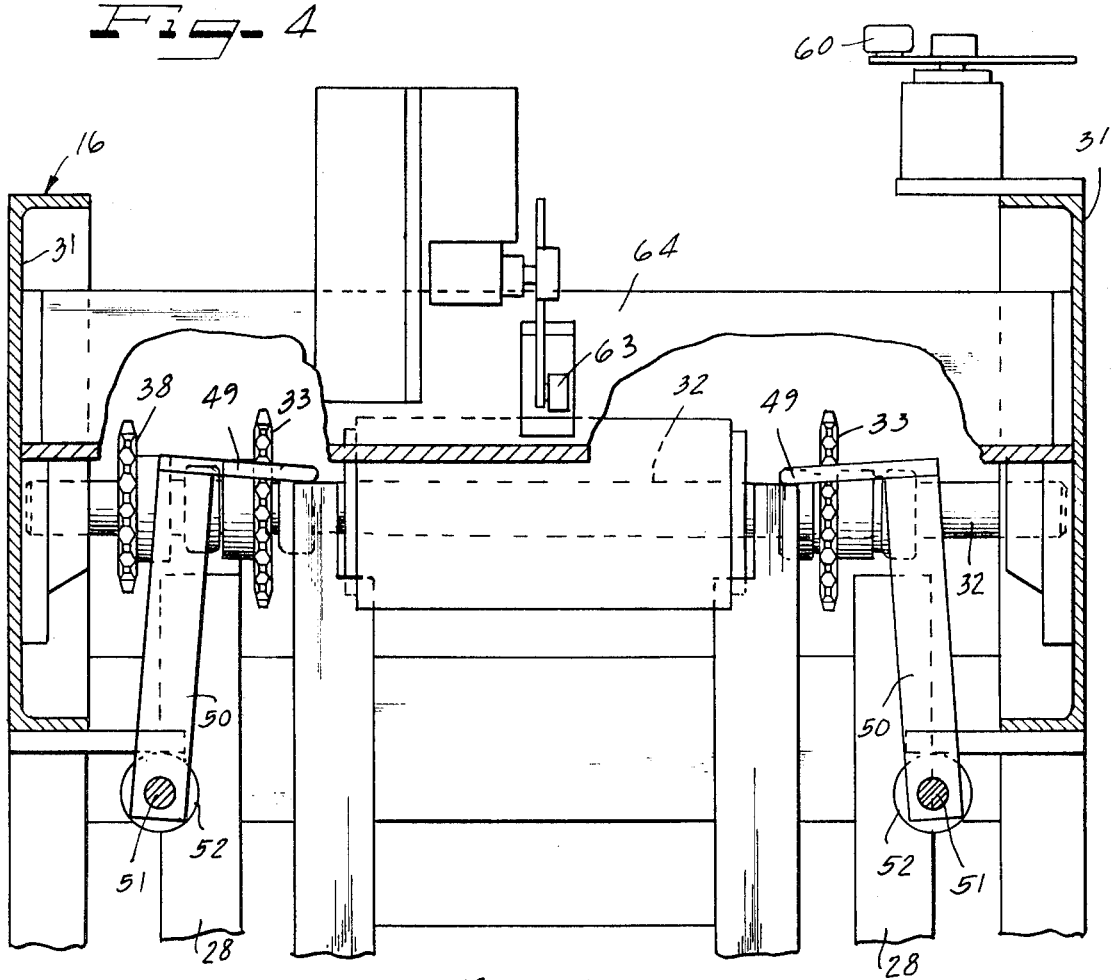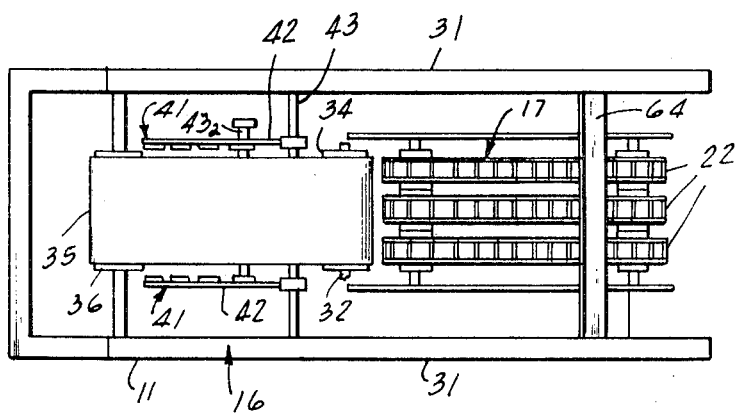

STACKER FOR CASES AND THE LIKE

SUMMARY AND OBJECTS OF THE INVENTION

Stacker for boxlike articles, such as cases, in which the cases are stacked by delivering one on top of the other, as lowered onto a delivery station where the column of cases is carried away from the stacker.

A principal object of the present invention is to provide a novel and improved form of stacker for boxlike articles such as cases, arranged with a view toward increasing the efficiency of stacking and delivering a column of cases, in a simple and expeditious manner.

Another object of the invention is to provide a simplified vertical stacker for boxlike articles, such as cases, by utilizing an endless chain for moving a platform between an upper loading station and lower delivery station and providing slide rails at the loading station and delivering cartons to the slide rails and separating the slide rails for discharge of the articles onto the platform, one on top of each other.

Still another object of the invention is to improve upon the stackers heretofore in use for stacking cases, cartons and the like by providing a downwardly moving platform for a first case of a column of cases, a delivery means carrying the stacked column of cases away from the platform, and supply means for supplying cases to the platform when in an elevated position, and accommodating the supply of cases one on top of the other, as the platform and cases travel downwardly to the delivery station.

A still further object of the invention is to provide a novel form of stacker for cases and the like, utilizing two laterally spaced endless chains carrying a lowering platform, and by providing a novel, simple and efficient control means for cases coming onto the stacker, to supply the cases for automatic stacking one on top of the other without interference, and thereby materially increasing the efficiency and speed of stacking.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

DESCRIPTION OF THE DRAWINGS

FIG. 1 is a diagrammatic view in side elevation, diagrammatically showing a form of stacker constructed in accordance with the principles of the present invention.

FIG. 2 is a diagrammatic front end view of the stacker, with certain parts broken away.

FIG. 3 is a partial fragmentary plan view of the stacker, with certain parts removed in order to more clearly illustrate the infeed and delivery conveyors of the machine; and FIG. 4 is an enlarged transverse sectional view of the upper part of the machine taken substantially along line II—II of FIG. 1 with certain parts broken away.

DESCRIPTION OF PREFERRED EMBODIMENT OF INVENTION

In FIG. 1 of the drawings, we have diagrammatically shown a stacker constructed in accordance with the principles of the present invention including a base 10, a generally boxlike frame 11 extending outwardly from said base and having a closed back wall 12, parallel spaced sidewalls 13 and an open front accommodating vertical movement of a platform 15 from an elevated loading station 16 downwardly to an aligned delivery station 17, near the bottom of said frame.

The platform 15 may be in the form of a pair of parallel spaced angle irons 19 pivoted at their rear ends to aligned links of a pair of laterally spaced endless chains 20. Braces 21 are pivoted to the angle irons 19 intermediate the ends thereof and extend angularly downwardly therefrom to the chains 20 and are pivotally connected thereto. Guide rollers 18 may be mounted on the endless chains 20 and extend within a vertical guideway 28, for guiding the endless chains 20 and angle irons 19, forming the platform 15, to assure that the platform will always be in a horizontal position during travel thereof from the elevated loading station 16 to the delivery station 17.

The delivery station 17 is shown in FIGS. 2 and 3 as being a series of side-by-side chain conveyors 22 having horizontal material carrying surfaces and supported between the sidewalls 13, 13 of the frame 11 in a suitable manner, which need not herein be shown or described in detail since it forms no part of the present invention. The chain conveyors 22 are simultaneously driven by suitable coaxial sprockets 23, at the outby ends of the conveyor chains. A motor 24 and speed reducer (not shown) contained in a speed reducer housing 25 are provided to drive the chain conveyors 22 through a chain and sprocket drive 26.

The chains 20 are driven from a main drive motor 27 to move the platform 15 up and down along the vertical guideway 28. The drive motor 27 has a speed reducer housing 29 forming a part thereof, having speed reducer gearing (not shown) therein including a clutch (not shown) and a separate brake (not shown), to effect a drive to the chains 20 and to stop travel of said chains and hold the chains from travel as the platform 15 is elevated into position to receive a case. A chain and sprocket drive 30 may be provided to drive the platform chains 20 and platform 15 mounted thereon, downwardly from the loading to delivery station along opposite sides of the conveyor chains 22 and to return the platform 15 back to the loading station 16. The motor 27 may be a reversible motor, to reciprocably move the platform 15 up and down upon reversal of said motor.

The loading station extends across the top of the frame 11 beyond opposite sides thereof and is shown in FIG. 1 as in the form of a pair of parallel spaced channels 31 suitably connected together and forming the frame 11 into a T-shaped frame. A shaft 32 extends between said channels and is suitably journaled therein and forms a mounting for idler sprockets 33 for the platform chains 20.

An infeed conveyor 35, which may be of any suitable construction, is mounted between the channels 31 inside of the idler sprockets 33. The conveyor 35 turns about a drive roller 34 keyed or otherwise secured to the shaft 32. Said shaft and roller, in turn are driven from the motor 24, through a sprocket 38 keyed or otherwise secured to said shaft and through a chain and sprocket drive 38$^a$ and a second chain and sprocket drive 38$^b$.

The infeed conveyor 35 is disposed inside of the chains 20 and platform 15 and is narrower than the cases being stacked. Said conveyor is inclined upwardly from an idler 36 at the rear end of the channels 31 and is positioned in case-receiving relation with respect to a transfer conveyor 37, shown as being upwardly inclined from its receiving to its delivery end. The conveyor 37 may be adjustable to receive and deliver cases or other packaging articles to the infeed conveyor 35. A motor and speed reducer 39 is provided to drive the conveyor 37 through a chain and sprocket drive 40.

The loading station 16 also includes a gate 41 blocking the supply of cases along the infeed conveyor 35 when the platform 15 is not in position to receive a case or when the cases stacked on said platform would intercept a case on said infeed conveyor. The gate 41 is shown in FIGS. 1 and 3 as including a pair of arms 42, pivoted for movement about the axis of a shaft 43. The arms 42 extend along opposite sides of the infeed conveyor 35. The arms 42 are connected together intermediate their ends by a rod 43$^a$, which extends between the material carrying and return runs of the infeed conveyor 35. A cylinder 44 having a piston rod 45 extensible therefrom is provided to move the gate 41 out of intercepting relation with respect to a case deposited on the infeed conveyor 35 and upwardly of opposite sides of said infeed conveyor above the material-carrying run thereof, to intercept a carton or case on said infeed conveyor. As diagrammatically shown in FIG. 1, the cylinder 44 is pivoted at its head end to a bracket 46 extending rearwardly of the rear wall 12 of the frame 11. The piston rod 45 is pivoted at its upper end to the rod 43$^a$ on the outside of an arm 42, to effect angular movement of the gate 41 about the axis of the shaft 43 into an open position or a closed case-intercepting position to block the supply of cases along the infeed conveyor 35. The arms 42 have a series of rollers 48 extending inwardly therefrom toward the conveyor 35 and adapted to engage and block passage of cartons along said conveyor.

The loading station also includes a pair of laterally spaced slide rails 49 extending horizontally from the delivery side of the infeed conveyor 35 at a loading level and along the opposite sides of the platform 15 when at a loading level. The slide rails 49 are each mounted on the tops of parallel spaced vertically extending arms 50, mounted at their lower ends on a rock shaft 51. The rock shaft 51 is pivotally mounted in spaced bearing bosses 52 extending beneath the flanges of the channels 31. The shafts 51 each extend forwardly of the arms 50 in parallel relation with respect to each other. Each shaft 51 has a lever arm 53 keyed or otherwise secured thereto and extending upwardly of said shaft in alignment with the arms 50. A cylinder 55, which may be a double-acting cylinder having operative connection with the upper ends of the lever arms 53 adjacent its opposite ends, is suitably mounted between the channels 31 and is operable upon the application of fluid under pressure thereto, to pivot the slide rails 49 outwardly about the axes of the shafts 51, to deposite a carton onto the platform 15 or onto the top of a case on said platform until a series of cases is stacked into a column of the required height.

The control of reciprocable movement of the platform 15 and the stacking of cases thereon is by a series of limit switches 60,61 and 63 at the loading station 16, controlling the loading of a case onto the platform, the opening and closing of the gate 41 and the initiation of lowering movement of the platform.

A limit switch 65 is spaced along the chain 20 close to but above the delivery station 17. This limit switch is operated by the platform 15 upon lowering movement thereof and effects closing of the gate 41 and overrides the limit switch 63, to continue lowering movement of the platform beneath the material carrying surfaces of the chain conveyors 22 to deposite a column of five cases onto said discharge chain conveyors 22.

A limit switch 66 is provided at the loading station 16 and is closed by the platform when in its discharge position, to stop-lowering movement thereof. A second limit switch 67 is provided at a discharge level forwardly of the chain conveyors 22 and is closed by engagement by a bottom carton of a stack of cartons, to effect upward movement of the platform 15 to its loading station as the column of cases is discharged therefrom.

A limit switch 69 is also provided at the loading station and is closed by the platform as moved upwardly by the chains 20 into a case-receiving position. Closing of the limit switch 69 stops upward movement of the platform and effects opening of the gate 41 to initiate a next succeeding stacking operation.

The limit switches 60,61,63,65,66,67 and 69 are conventional forms of limit switches and are connected in an electrical control circuit (not shown) controlling operation of the stacker through a series of relays (not shown) including time delay relays, where required. The electrical control circuit may be of any well-known form and is no part of the present invention, so need not herein be shown or described further.

Referring now to the sequence of operation of the stacker, when starting the stacker, a pushbutton (not shown) may first be pushed. This will start the motors 27,24 and 39 and will also supply fluid under pressure, such as air to the cylinder 44 to open the gate 41. At least one other pushbutton (not shown) may be provided to stop the stacking operation at any time.

A first case delivered from the transfer conveyor 37 onto the infeed conveyor 35 will engage and close the limit switches 61 and 60. This will effect the supply of fluid under pressure to the cylinder 44 and pivot the gate 41 upwardly to close said gate and block the supply of cartons to the infeed conveyor 35. The limit switch 61 is ineffective to complete an energizing circuit until closing of a limit switch 63 disposed forwardly of the forward ends of the slide rails 49. Said limit switch 63 is supported on a stop 64 for the case. Said stop extends across and connects the channels 31 together.

Engagement of the limit switch 63 by the first case will close said switch. A next succeeding case at the gate 41 will also engage and hold the switch 61 closed. The slide rail cylinder 55 will then be energized and effect separation of the slide rails and deposit the first case onto the platform 15. This will also cause downward movement of the platform 15 with the first case thereon. As the first case passes beneath the limit switch 63, the switch 63 will open and lowering movement of the platform will stop with the top of the first case at a level to have a second case stacked thereon. As the limit switch 68 opens, the slide rails 49 are moved inwardly into their case-supporting positions. The gate 41 will then open and a second case will be delivered along the infeed conveyor 35, closing the limit switches 60 and 61 and the limit switch 63 as the case reaches the end of the slide rails 49, and thereby effect the depositing of a second case on top of the first case. The stacking cycle will then be repeated and a third case held by the gate 41 will be released to pass by the gate 41 and close the limit switch 63 and be loaded on the top of the second case.

When a fourth case is loaded on top of the third case, the platform will engage the limit switch 65. This will effect closing of the gate 41 and prevent the transfer of a case onto the infeed conveyor 35. At this time, a fifth case has already passed through the gate 41. The platform will continue its lowering movement below the tops of the chain conveyors 22 at the loading station 16 and engage and close the limit switch 66. As the platform closes the limit switch 66, the column of cases will be deposited on the chain conveyors 22 and carried away by said chain conveyors. As the limit switch 66 closes, after a sufficient time delay to accommodate the column of cases to be moved away from the platform 15 by the chain conveyors 22, the drive to the platform chains 20 will be reversed, and the platform 15 will return to its loading position. The stack of cases at this time will close the limit switch 67, which will open the gate 41 and accommodate the initiation of a next succeeding stacking operation. As the platform moves upwardly to engage and close the limit switch 69, the drive to the platform chains 20 will be stopped, and the gate 41 will be moved into its open position. The stacking of another column of cases is then initiated.

We claim:

1. In a stacker particularly adapted for boxlike articles, such as cases, cartons and the like, a base frame, a vertical guideway extending upwardly of said base frame, a pair of laterally spaced endless chains guided in said guideway for travel in laterally aligned vertically extending orbital paths, a platform including a support member extending horizontally from each of said chains, said support members being laterally aligned and moved by said chains in the same planes, means bracing said support members to extend horizontally of said chains, a motor, a drive connection from said motor to said chains to drive said chains and move said platform vertically along said guideway in reverse directions and in the same vertical paths, a delivery station extending along said base and including a horizontal conveyor narrower than the space between said support members to accommodate said support members to pass therebeneath and deposit a stack of articles thereon, means for driving said conveyor, an elevated loading station at the upper end of said guideway and including an infeed conveyor disposed between said endless chains and support members and spaced on the opposite side of said guideway from said delivery conveyor, and stop gate means controlling the supply of cartons along said infeed conveyor, and movable into position along each side of said infeed conveyor to intercept the cartons as traveling thereonto, said loading station also including a pair of laterally spaced slide rails on the opposite side of said guideway from said infeed conveyor in carton-receiving relation with respect thereto and in vertical alignment with said delivery conveyor, means driving said infeed conveyor, parallel horizontal shafts extending beneath said slides and outside of the paths of travel of said endless chains, arms extending vertically of said shafts and supporting said slides thereon for movement about the axes of said shafts, power means operatively connected with said arms for pivotally moving said arms about the axes of said shafts into carton-supporting relation relative to said infeed conveyor and into position to deposit a carton on said support members.

2. The stacker of claim 1, wherein the stop gate means controls the supply of cartons along said infeed conveyor to said slides in accordance with the vertical position of said platform and comprises, a pair of arms having article-engaging means on the ends thereof adjacent the incoming end of said infeed conveyor, and pivoted for movement about a common axis spaced along said infeed conveyor towards the discharge end thereof, and extending along opposite sides of said infeed conveyor, and power means for moving said arms together into carton intercepting positions above the plane of said conveyor and into carton release positions beneath the plane of said conveyor.

3. The stacker of claim 1, wherein control means are provided for said motor, driving said endless chains along said guideway, for elevating said platform to the upper end of said guideway in a continuous operation, and for lowering said platform step by step distances determined by the height of the individual cartons stacked thereon and the number of cartons on said platform.

4. The stacker of claim 3, wherein means are provided for driving said infeed conveyor and said delivery conveyor continuously during operation of the stacker, and wherein the control means for said motor driving said endless chains and elevating and lowering said platform comprises a series of carton operated limit switches at said loading station controlling lowering of said platform and closing of said drop gate, a second series of cooperating limit switches spaced along said guideway controlling downward travel of said platform, stopping movement of said platform on its return travel at the upper end of said guideway and continuing movement of said platform beneath the surface of said delivery conveyor when all but the last carton of a stack of cartons have been deposited thereon, and a third set of limit switches spaced along said delivery conveyor stopping lowering movement of said platform and effecting reverse of said motor and upward travel of said platform to said loading station as the stack of cartons is delivered by said delivery conveyor.

5. The stacker of claim 3, wherein the means driving said delivery conveyor and said infeed conveyor includes a second motor and drive connections from said second motor to said infeed conveyor and said delivery conveyor for continuously driving said infeed conveyor and said delivery conveyor during operation of the stacker.